United States Patent [19]
Goto et al.

[11] Patent Number: 5,862,419
[45] Date of Patent: *Jan. 19, 1999

[54] CAMERA CAPABLE OF DISPLAYING BRIGHTNESS DISTRIBUTION

[75] Inventors: Tetsuro Goto, Funabashi; Tsutomu Narisawa, Saitama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 583,485

[22] Filed: Jan. 5, 1996

Related U.S. Application Data

[63] Continuation of Ser. No. 149,801, Nov. 10, 1993, abandoned.

[30] Foreign Application Priority Data

Nov. 12, 1992 [JP] Japan ................................. 4-327312

[51] Int. Cl.⁶ ............................ G03B 7/08; G03B 13/36; G03B 17/18
[52] U.S. Cl. ......................... 396/121; 396/147; 396/234; 396/287; 396/299
[58] Field of Search ...................................... 354/402, 409, 354/429, 432, 471, 474, 475, 430; 356/222, 226, 227; 348/233, 211

[56] References Cited

U.S. PATENT DOCUMENTS

| | | | |
|---|---|---|---|
| 4,047,187 | 9/1977 | Mashimo et al. | 354/402 |
| 4,309,091 | 1/1982 | Fukuhara et al. | 354/432 |
| 4,456,931 | 6/1984 | Toyoda et al. | 348/233 X |
| 4,614,975 | 9/1986 | Kaite | 354/402 X |
| 4,684,995 | 8/1987 | Baumeister | 354/402 X |
| 5,051,770 | 9/1991 | Cornuejols | 354/432 |
| 5,121,152 | 6/1992 | Wagner | 354/402 |
| 5,196,929 | 3/1993 | Miyasaka | 354/430 |
| 5,210,566 | 5/1993 | Nishida | 354/402 |
| 5,258,805 | 11/1993 | Aoki et al. | 354/475 |

FOREIGN PATENT DOCUMENTS

| | | |
|---|---|---|
| 4-215631 | 8/1992 | Japan . |
| 4-251230 | 9/1992 | Japan . |

*Primary Examiner*—W. B. Perkey
*Attorney, Agent, or Firm*—Oliff & Berridge, PLC

[57] ABSTRACT

The camera capable of displaying brightness distribution of the present invention is equipped with a photometric sensor which has a plurality of photoelectric conversion subelements which perform photometry on a plurality of regions into which the subject is divided, and a display device, having a plurality of display elements, which displays the brightness distribution over the subject as detected by the photometric sensor.

30 Claims, 14 Drawing Sheets

F I G. 4
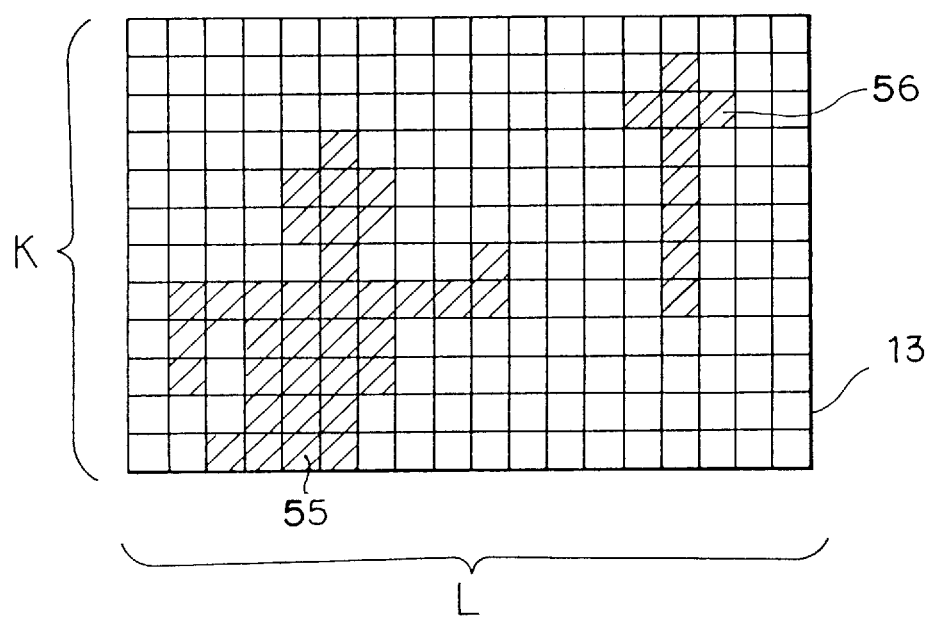

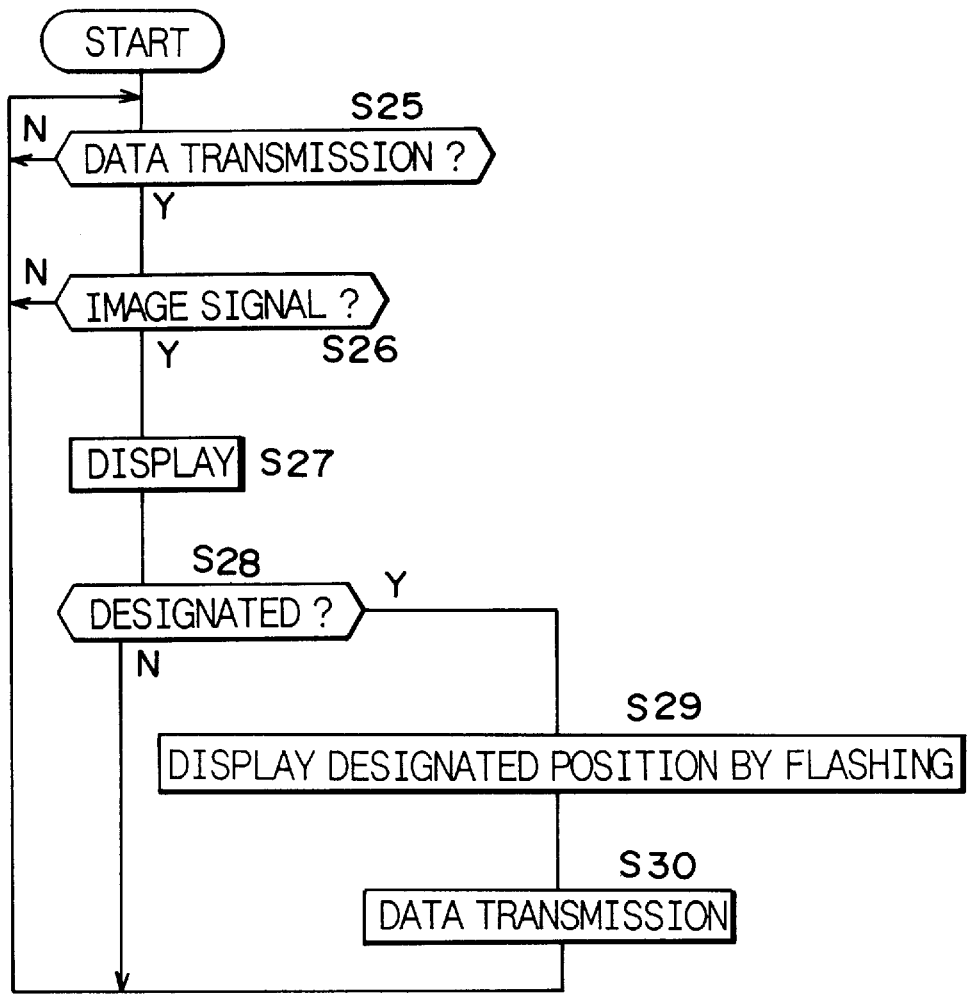
F I G. 10

F I G. 14
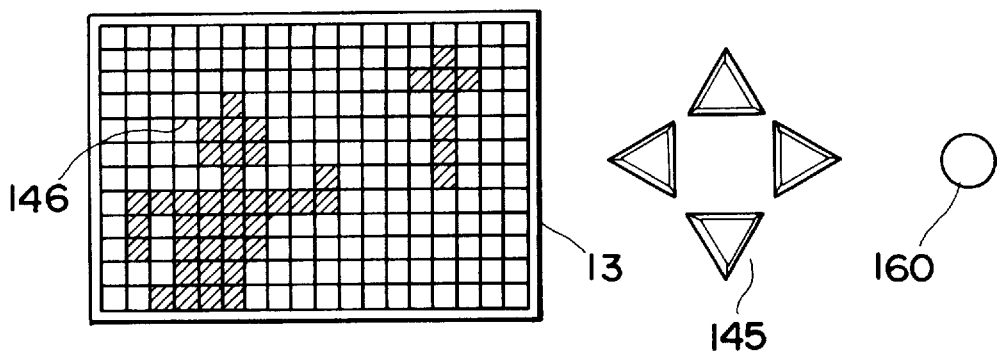
F I G. 15
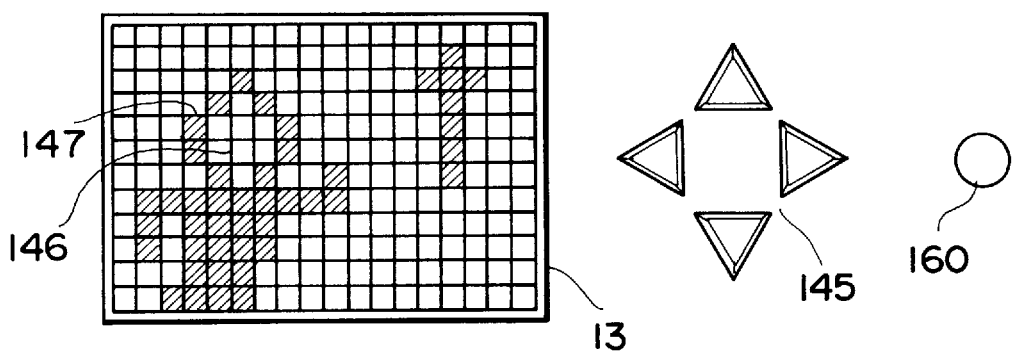

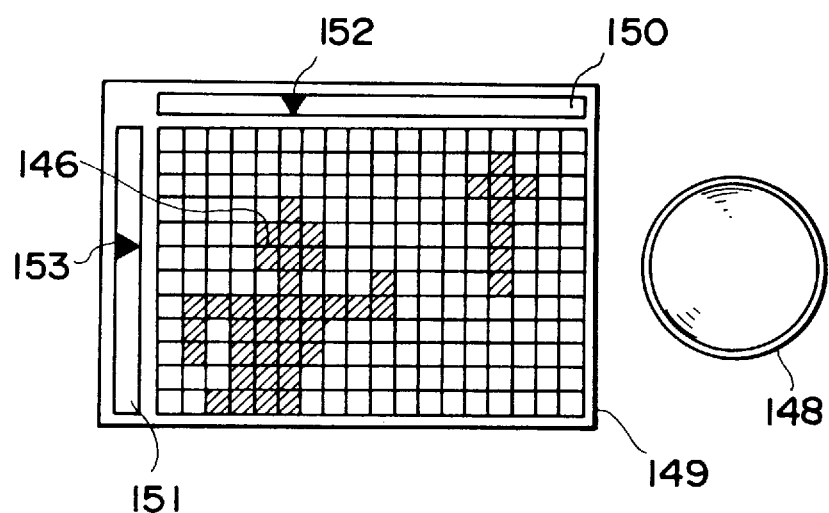
F I G. 16

CAMERA CAPABLE OF DISPLAYING BRIGHTNESS DISTRIBUTION

This is a Continuation of application Ser. No. 08/149,801 filed Nov. 10, 1993, now abandoned.

BACKGROUND OF THE INVENTION

1. Field of the Invention

The present invention relates to a camera which is capable of performing photometry on a subject divided into a plurality of regions and of calculating an exposure value based upon the photometric outputs from these regions, and particularly relates to such a camera which is provided with a display device for displaying the brightness distribution over the subject.

2. Related Background Art

Recently more and more cameras have been produced which utilize a so called finely divided photometry method. With this finely divided photometry method, photometry is performed on a plurality of regions into which the subject is divided, and a photometric signal is obtained for each of these regions. For this method, the photometric conversion element constituting the photometric sensor is divided into a plurality of sub-elements which correspond to the above described plurality of regions. Through exposure calculation based upon the photometric output of the divided photometric elements, it is possible to perform photography of the principal object to be photographed with appropriate exposure settings, without the illumination level of the background exerting any effect.

With this type of finely divided photometry method, the greater is the number of sub-elements of the photometric sensor, the more finely can the brightness distribution over the principal object to be photographed and its surroundings be obtained. Accordingly the more accurately can the exposure value be determined. Therefore in recent years the number of sub-elements has increased steadily up to the range of several tens to several hundreds. For examples, reference may be made to Japanese Patent laid-open Application No. 4-215631 and U.S. patent Ser. No. 813,525.

Now, with a camera having a prior art finely divided photometry function as described above, the exposure value is calculated based upon the photometric values obtained for the various regions, and the result of the calculation is displayed upon a display device. However, such a display has not been extended so far as to show the results of the photometry performed for the various regions, i.e. the distribution of brightness over the subject. Therefore, there remains the inconvenience that the photographer cannot determine what are the brightness conditions in the various portions of the subject.

With a camera having a finely divided photometry function according to the prior art, normally the construction is such that the exposure amount is determined by supposing only the central portion of the various photometric regions into which the subject is divided to be the important region in which the object to be photographed is to be found. Accordingly, in the case when a photograph is to be taken with the object being positioned intentionally outside the central portion of the photographic frame, there has been the problem that photography has been performed without the intention of the photographer being reflected, and thus using an undesirable exposure value.

SUMMARY OF THE INVENTION

The objective of the present invention is to provide a camera having the finely divided photometry function and capable of displaying the results of photometry for the plurality of photometric regions which the camera has discriminated.

In order to attain this objective, a camera capable of displaying brightness distribution according to the present invention comprises a photometric sensor, which comprises a plurality of photometric conversion sub-elements, which performs photometry on a plurality of regions into which the subject is divided, and a display device which displays the brightness distribution over the subject as detected by the photometric sensor.

According to the present invention, since the brightness distribution over the subject as detected by the photometric sensor is displayed on the display device, the photographer can check the brightness distribution over the subject before performing photography.

A camera capable of designating a principal object to be photographed according to the present invention, comprises a photometric sensor which comprises a plurality of photometric conversion sub-elements which perform photometry on a plurality of regions into which the subject is divided, a display device which displays the brightness distribution over the subject as detected by the photometric sensor, and a designation device which designates any one of a plurality of positions within the display region of the display device.

According to the present invention, after observation of the photometry condition of the subject displayed on the display device, when a portion which photographer wishes an appropriate exposure is designated by the designation device, an exposure value is calculated so that the appropriate exposure is attained for the designated portion. Accordingly, a principal object can be photographed with the appropriate exposure in spite of any positions of the principal object within the subject.

Further, another camera capable of displaying brightness distribution according to the present invention, comprises a photometric sensor comprising M×N photometric conversion sub-elements arranged in the form of a matrix which measures M elements in the vertical direction by N elements in the horizontal direction, and which performs photometry on M×N regions into which the subject is divided, and a display device which comprises K×L liquid crystal display elements arranged in the form of a matrix which measures K elements in the vertical direction by L elements in the horizontal direction and each of which is capable of being set to any one of a plurality of intensity levels, and which displays the brightness distribution over the subject as detected by the photometric sensor.

According to this aspect of the present invention, the same operational results and advantages are obtained as with the first aspect described above, and because the display elements are arranged in the form of a matrix, the photometric situation over the entire subject can be easily checked. In addition, since the display elements which constitute the display device are capable of being set to any one of a plurality of intensity levels, it is possible to grasp the photometric situation accurately.

BRIEF DESCRIPTION OF THE DRAWINGS

FIG. 4 is a figure showing a display device which is provided on a rear lid;

FIG. 10 is a flow chart showing procedures of a control program in the rear lid;

FIGS. 14 and 15 are explanatory figures of a variant embodiment of an alternative designation device for designating the position of an object to be photographed; and:

FIG. 16 is an explanatory figure of another variant embodiment of another alternative designation device.

DESCRIPTION OF THE PREFERRED EMBODIMENTS

A preferred embodiment of the present invention as applied to a single lens reflex camera will now be explained with reference to FIGS. 1 through 13.

Figure 1:
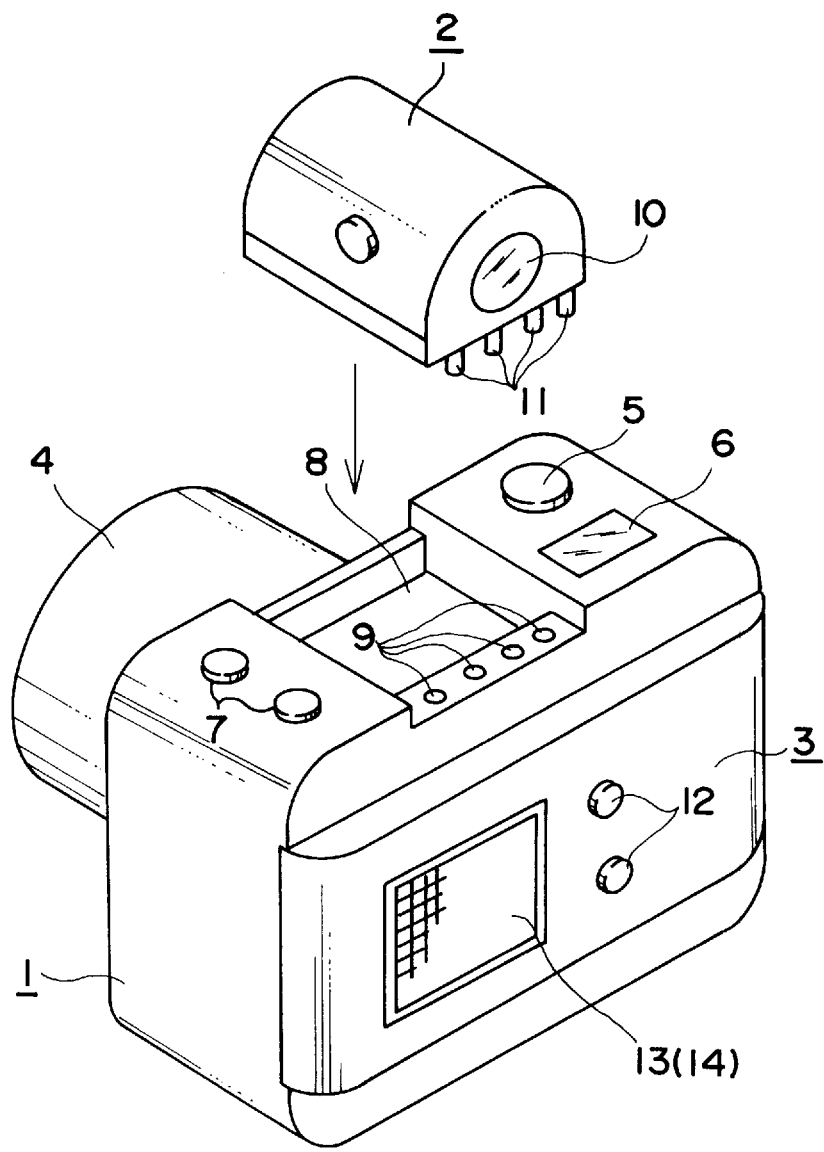
FIG. 1 is a perspective view showing a camera according to the preferred embodiment of the present invention.

FIG. 1 is a perspective view as seen from the rear showing the outside of a single lens reflex camera according to this preferred embodiment of the present invention. The reference numeral 1 denotes the main body of the camera, and 2 denotes a detachable viewfinder which can be attached to and separated from a screen portion 8 on the upper surface of the camera body 1. 3 denotes a rear lid provided on the rear surface of the camera body 1 which can be opened and closed and 4 denotes a detachable photographic lens which can be attached to and separated from the front of the camera body 1. On the upper surface of the camera body 1, there are provided a release button 5, a liquid crystal display 6, and setting buttons 7. The setting buttons 7 are for setting the selection of a photometric mode or an exposure control mode or a film forwarding mode or the like.

Figure 2:
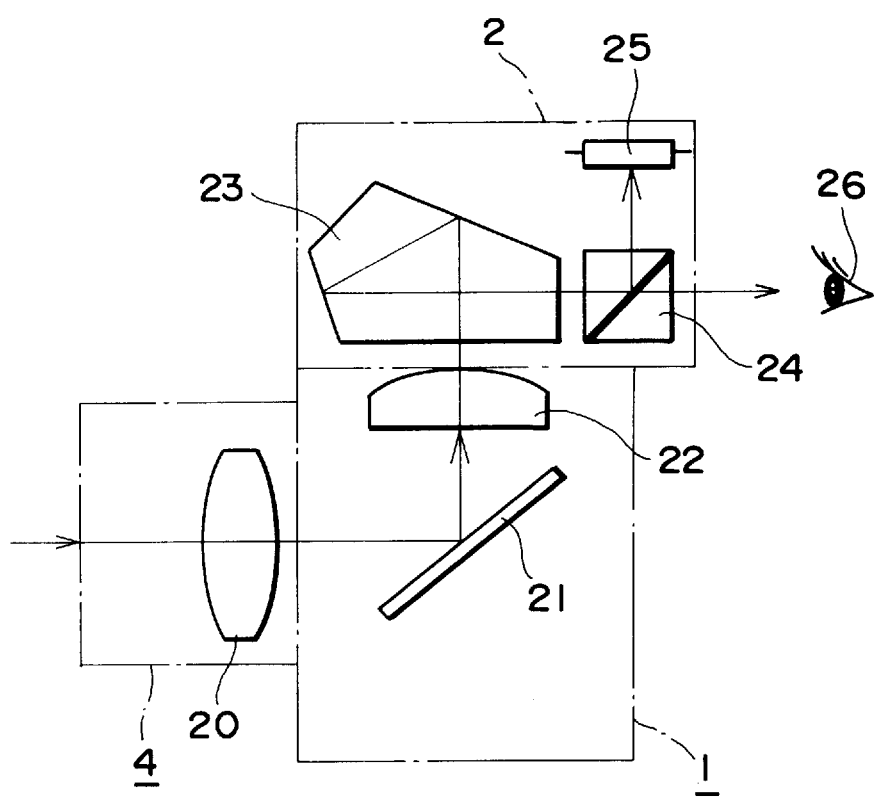
FIG. 2 is a figure showing the optical system of the camera.
Figure 6:
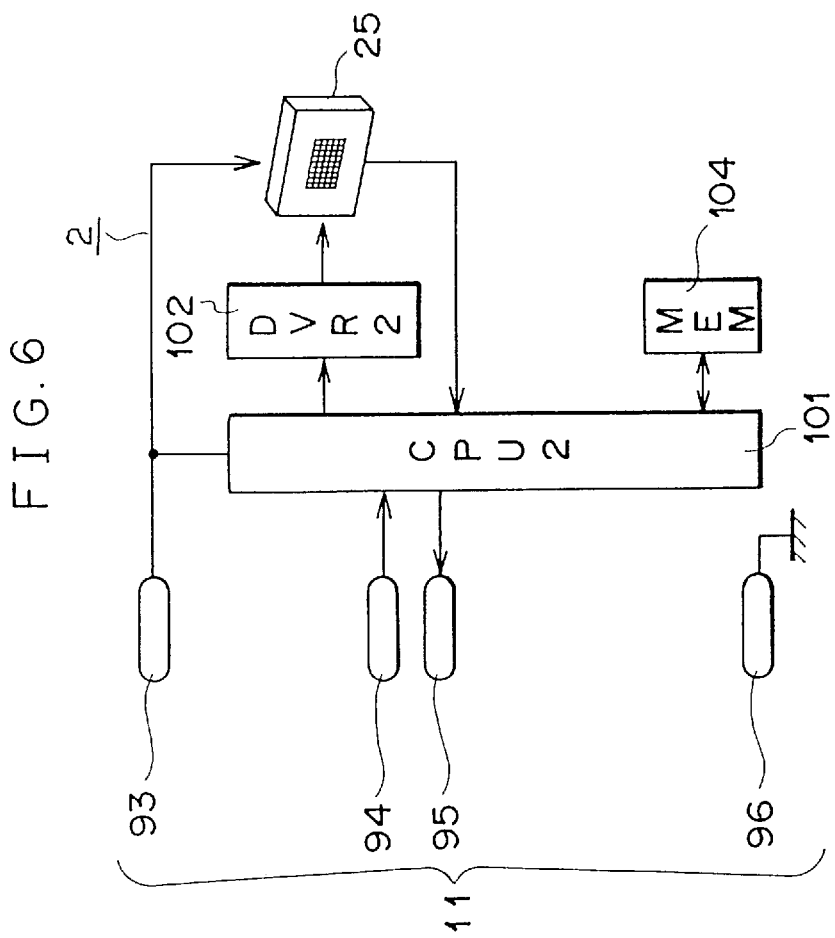
FIG. 6 is a block diagram showing a control system provided within the viewfinder.

The viewfinder 2 comprises an eyepiece section 10 which is used to view an object to be photographed, a photometric sensor 25 shown in FIG. 2, and an electrical circuit, a block diagram of which is shown in FIG. 6. When the viewfinder 2 is fitted to the screen portion 8, the contacts of a contact group 11 of the above electrical circuit are respectively brought into contact with the contacts of a contact group 9 of the screen 8, and thereby the circuitry in the viewfinder 2 is brought into electrical communication with the circuitry in the camera body 1. The rear lid 3 incorporates setting buttons 12, a display device 13, a touch panel 14 fitted over the display device 13, and a electric circuit shown in FIG. 7 connected to the electric circuit in the camera body 1. The display device 13 and the touch panel 14 will be described in detail hereinafter.

FIG. 2 is a figure showing the optical system in which a light beam from the object to be photographed passes through the photographic lens 4, the camera body 1, and the viewfinder 2. The reference numeral 20 denotes an optical system which is provided within the photographic lens 4.

The light rays from the object to be photographed which have passed through the optical system 20 are reflected in the upward direction from a main mirror 21 in the camera body 1, and these reflected light beams are focused upon a screen 22 incorporated in the screen portion 8. After this focused light from the object to be photographed has been directed upon a half silvered mirror 24 via a pentaprism 23, a portion thereof passes through the half silvered mirror 24 X to the eyepiece section 10, and to the eye 26 of the photographer, while another portion thereof is reflected in the upward direction to fall upon a photometric sensor 25.

Figure 3:
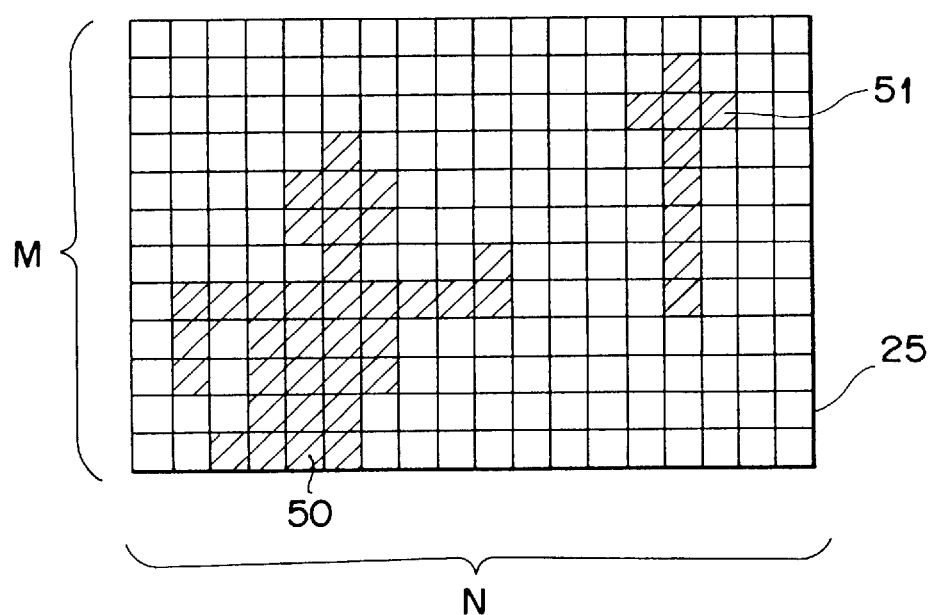
FIG. 3 is a figure showing how a photometric element is divided into regions.

The photometric sensor 25 may be, for example, an image sensor made up of CCDs (charge coupled devices). As shown in FIG. 3, the photometric sensor 25 comprises, within a predetermined light receiving area, M×N sub-elements (photoelectric conversion devices) arranged in the form of a matrix which has M rows and N columns, a charge accumulation section, a transmission section, and a voltage conversion section, none of which sections are shown in the figures. Each of the sub-elements receives light rays from the subject and performs photoelectric conversion, and the charge accumulation section accumulates the electric charge which is generated by this photoelectric conversion process. These accumulated electric charges are read out by the transmission section in time series according to the receipt of a predetermined clock signal. The electric charges thus read out are converted into voltages by the voltage conversion section to be input to a CPU 101 shown in FIG. 6. In other words, in this preferred embodiment, photometry is performed on the M×N regions into which the subject is divided. In FIG. 3, there is shown an exemplary pattern for the magnitudes of the photometric output from the photometric sensor 25, i.e. for the brightness levels of the corresponding portions of the subject. The portions 50 and 51 shown in this figure by the hatching correspond to an object to be photographed whose illumination level is relatively low. Incidentally, the photometric sensor 25 can detect a hue signal of an object to be photographed as well as a brightness signal thereof.

FIG. 4 shows an example of the display which is provided on the display device 13 on the rear lid 3 based upon the photometric output signals as shown in FIG. 3. The display device 13 is constructed as an image display device using for example a liquid crystal (hereinafter abbreviated as a LCD). In the case of a so called dot matrix LCD, vertical and horizontal scanning lines are provided, and it is possible to provide the function of displaying the desired pattern by controlling the intensity of the picture elements at the intersections of these scanning lines. For example, if the brightness distribution over the subject is as shown in FIG. 3, the images 50 and 51 of the objects to be photographed are represented on the display device 13 by the images 55 and 56 respectively. The photographer is informed, by this image being displayed, of the photometric circumstances determined by the processing circuitry within the camera. In this manner, in this preferred embodiment, it is possible to discriminate the image of the object to be photographed based upon the above described photometric outputs, and therefore in the following explanation, the photometric signals used for this display will particularly be termed the object image signal.

Incidentally, although in FIG. 4 only two intensity levels (black and white) for the picture elements are shown, in fact the intensity level of each pixel is capable of being set to any one of a plurality of intensity levels in accordance with the magnitude of the photometric signal to which it corresponds.

For the exemplary display shown in FIG. 4, the display resolution of the display device 13 is shown as being K vertically by L horizontally. If as an example the relationship between the display resolution K×L of the display device 13 and the above described photometric resolution M×N of the photometric sensor 25 is assumed to be $$M \approx K, N \approx L$$

then the brightness distribution for each separated region of the subject as determined by photometry can be checked virtually faithfully on the display device 13. However it is not absolutely necessary for the resolutions of the photometric sensor 25 and of the display device 13 to agree with one another exactly, and it will be acceptable for them to be almost the same, since it is sufficient to be able to distinguish the essence of the results of the photometric operation.

Further, although the relationship $$M<k, N<L$$

is acceptable, in these circumstances the display capability of the display device 13 comes to be limited by the resolution capability of the photometric sensor 25. However if the display device 13 is to be used for display of fine numerical data and the like, as well as for the display of the image of the object to be photographed as shown in FIG. 4, then by employing a display device 13 for which the above relationship holds the display device will have enough display capacity to be used for all of these various objectives.

Further, although an accurate display of the image of the object to be photographed as obtained according to photometry cannot be provided on the display device 13 if the relationship $$M>K, N>L$$

holds, nevertheless, if it is acceptable for the distribution of brightness to be only roughly grasped, then by employing a display device 13 for which the above relationship holds it is possible to simplify the display device, and accordingly an advantage with regard to cost is reaped.

Electrical circuitry incorporated in the camera body 1, in the viewfinder 2, and in the rear lid 3 will be explained.

Figure 5:
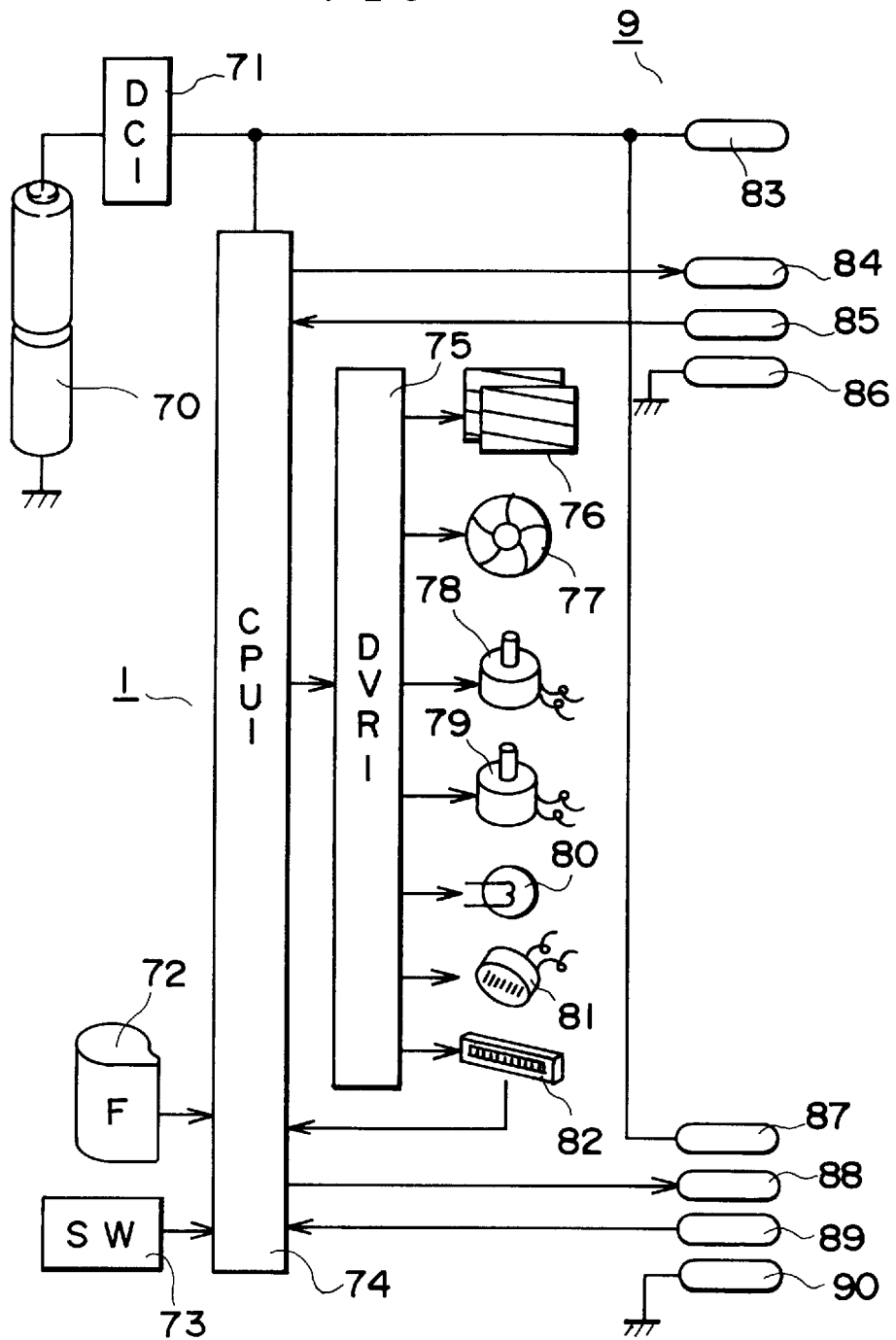
FIG. 5 is a block diagram showing a control system provided within the camera body.

FIG. 5 is a block diagram showing circuitry within the camera body 1. Actuating electrical energy is supplied from a battery 70 via a DC/DC converter 71 to all of the FIG. 5 circuitry, and is also supplied to the circuitry in the viewfinder 2 (see FIG. 6) via a contact 83, and to the circuitry in the rear lid 3 (see FIG. 7) via a contact 87. The contact group 9 (see FIG. 1) is made up of four contacts 83 through 86. When the viewfinder 2 is fitted to the camera body 1, these contacts 83 through 86 come into respective contact with four contacts 93 through 96 of which the contact group 11 is composed. Four contacts 87 through 90 (see FIG. 5) come into respective contact with four contacts 97 through 100 provided on the rear lid 3.

The reference numeral 74 denotes a central processing control circuit (hereinafter referred to simply as a CPU) which comprises a CPU, ROM, RAM, etc. and which performs overall sequencing of this camera. To this CPU 74 there are input from the circuitry incorporated in the viewfinder 2 via the above described contact 85 the photometric signals (the object image signals) and the exposure data. Also from the circuitry incorporated in the rear lid 3 there is input to this CPU 74 via the contact 89 a position designation signal, which will be described hereinafter, for the object to be photographed. On the other hand, the CPU 74 outputs the film ISO sensitivity and the position designation signal for the object to be photographed to the circuitry in the viewfinder 2 via the contact 84, and also outputs object image signals to the circuitry in the rear lid 3 via the contact 88.

Further, to the CPU 74 there is also connected certain circuitry which will now be described.

The reference numeral 72 denotes a film sensitivity detection circuit, which detects the ISO sensitivity of the film loaded into the camera and inputs a signal representative thereof to the CPU 74. 73 denotes a switch group which comprises a plurality of switches and which inputs to the CPU 74 a signal representative of the ON/OFF states of these switches. These switches include a first stroke switch which is turned ON when the release button 5 (see FIG. 1) is partially depressed, a second stroke switch which is turned ON when the release button 5 is fully depressed, setting switches which are turned ON and OFF in accordance with the operation of the two setting buttons 7 and 12.

To the CPU 74, there are connected via a drive circuit 75, a shutter 76, an iris 77, a film feeding motor 78, a focusing motor 79, a lamp 80 for moderating the red eye phenomenon, a supplementary lamp 81 for assisting with focus detection, and a focus detection element 82. The CPU 74 drives the focusing motor 79 based upon the output signal from the focus detection element 82 so as to perform focusing action, drives the iris 77 and the shutter 76 based upon the exposure data calculated on the side of the viewfinder 2 and performs exposure action, and drives the film feeding motor 78 so as to perform film winding on and rewinding up actions. Further, when flash photography is to be performed using an electronic flash device not shown in the figures, the lamp 80 is turned on before the flash photograph is taken, in order to prevent or reduce the so called red eye phenomenon in which the eyes of people appearing in the subject appear reddened. If the brightness level of the object is less than a certain predetermined value, then the above described supplementary lamp 81 is turned on so as to illuminate the object, in order to be able to perform the focus detection operation accurately by using the focus detection element 82.

FIG. 6 is a block diagram showing circuitry within the viewfinder 2. A CPU 101 drives the photometric sensor 25 via a drive circuit 102, and inputs the photometric output signal. The output photometric signal is temporarily stored in a storage circuit 104, and when required is read out by the CPU 101 and is used for exposure calculation. The calculated exposure data are sent to the main body 1 of the camera via the contact 95.

Figure 7:
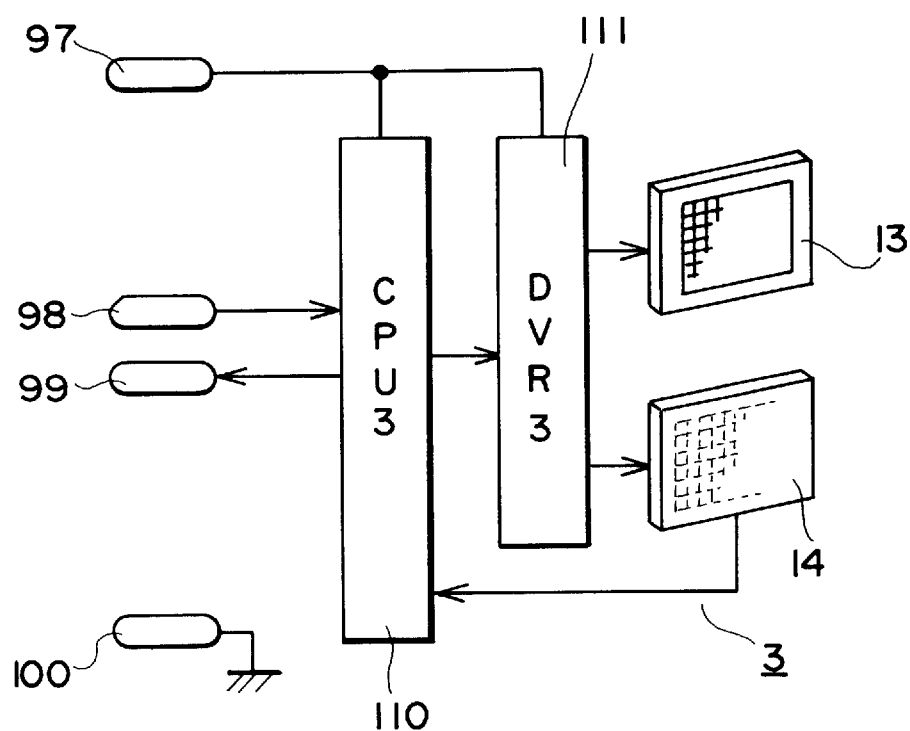
FIG. 7 is a block diagram showing a control system provided within the rear lid.

FIG. 7 is a block diagram showing circuitry within the rear lid 3. Via a drive circuit 111, a CPU 110 is connected to the above described display device 13 and also to the touch panel 14 which is provided on the display device 13. Object image signals are transmitted from the viewfinder 2 via the body 1 of the camera and thence via the contact 98 to the CPU 110, and based upon these object image signals an image of the object to be photographed which corresponds to the photometric output is displayed under controlling of the CPU 110.

The touch panel 14 is for outputting a signal designating the position of the principal object to be photographed (hereinafter termed the position designation signal) according to pressure exerted by the fingertip of the camera user, and the position designation signal is inputted to the CPU 110. After the photographer views the image being displayed on the display device 13 through the touch panel 14, when his fingertip presses against the portion of that image which represents the principal object to be photographed, and in respect of which he wishes an appropriate exposure or appropriate focusing, the pressed particular portion of the touch panel 14 turns on. The turning on of this particular portion is detected by the CPU 110 and information indicating the particular portion is stored. However it would be possible, according to the present invention, to perform the operation of designating the principal object to be photographed by using a different type of switching means, instead of by using this type of touch panel 14. Such an alternative switching means will be described hereinafter with reference to FIGS. 14 through 16.

The position signal of the principal object to be photographed designated as above is transmitted from the CPU 110 via the contact 99 to the camera body 1, and thence is transmitted to the viewfinder 2 in which the position signal is used for exposure data calculation.

In the following, the operation of this preferred embodiment of the present invention will be explained with reference to the flow charts shown in FIGS. 8 through 10.

Figure 8:
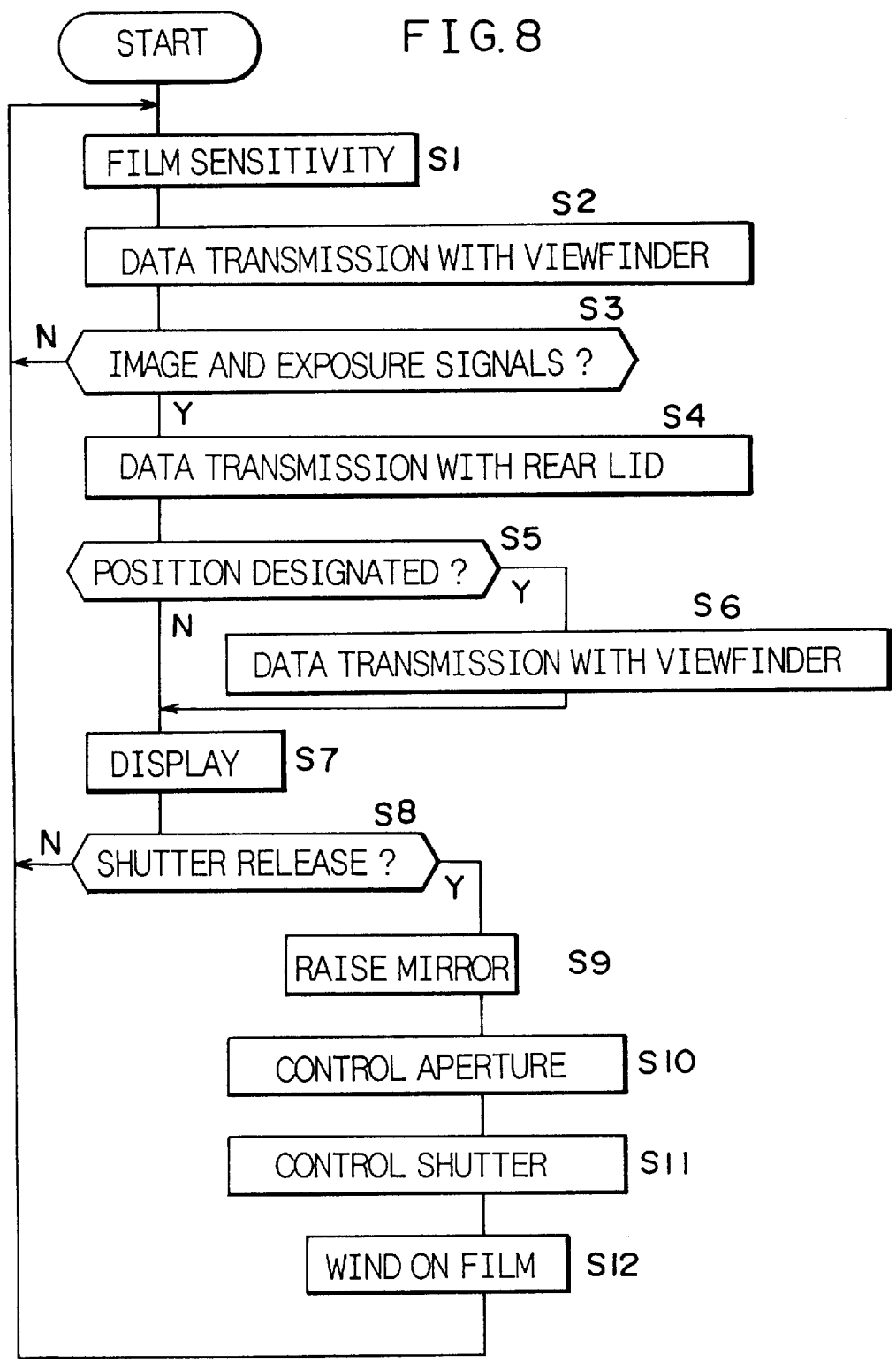
FIG. 8 is a flow chart showing procedures of a control program in the camera body.

FIG. 8 is a flow chart showing the operation of the control program for the CPU 74 incorporated in the camera body 1. This control program is repeatedly executed in an endless loop as long as the first stroke switch is turned ON by the release button 5 being partially depressed, i.e. as long as actuating electrical energy continues to be supplied from the DC/DC converter 71 to the CPU 74.

In the step S1, the ISO sensitivity of the film is detected by the film sensitivity detection circuit 72 and in the step S2 the detected film sensitivity is transferred via the contact 84 to the viewfinder. In the step S3, a decision is made as to whether or not an object image signal and exposure data (iris opening value and shutter speed) are received from the viewfinder. I.e., the CPU 101 in the viewfinder 2, as will be described hereinafter, calculates the exposure data using the photometric output signals from the photometric sensor 25 and using the film sensitivity value transmitted as described above in the step S2 and the like. The CPU 101 transmits the results of this calculation to the camera body 1 and also transmits to the camera body 1 these photometric output as an object image signal.

When in the step S3 it is judged that such an object image signal and exposure data are not received, the flow of control returns to the step S1, while when they are received control passes to the step S4. In the step S4, a communication with the rear lid 3 is performed. I.e., the object image signal input in the step S3 is transferred to the side of the rear lid 3, and also, if the position of a principal object to be photographed is designated by the touch panel 14, the above described position designation signal is input to the CPU 74 from the side of the rear lid 3. In the step S5, a decision is made as to whether or not the position designation signal has been input in the step S4. If the position designation signal has been input, in the step S6 again communication with the viewfinder 2 is performed. I.e. the position designation signal is transferred to the side of the viewfinder 2 and the flow of control passes to the step S7. If the position designation signal has not been input, then the flow of control proceeds directly to the step S7.

In the step S7, the CPU 74 displays the received iris opening value and shutter speed on the liquid crystal display 6. In the step S8, a decision is made as to whether or not the release switch included in the switch group 73 is turned ON. If the answer is negative, the flow of control returns to the step S1, while if the answer is affirmative, the flow of control passes to the step S9 and the following in which the action of photography is performed.

Namely, first the main mirror 21 is raised (in the step S9), and the iris 77 is controlled via the drive circuit 75 to be set to the calculated aperture opening value (in the step S10). Then, the shutter 76 is controlled to open and close according to the calculated shutter speed (in the step S11). Finally, the film feeding motor 78 is controlled to wind on the film (in the step S12), and then the flow of control returns to the step S1.

Figure 9:
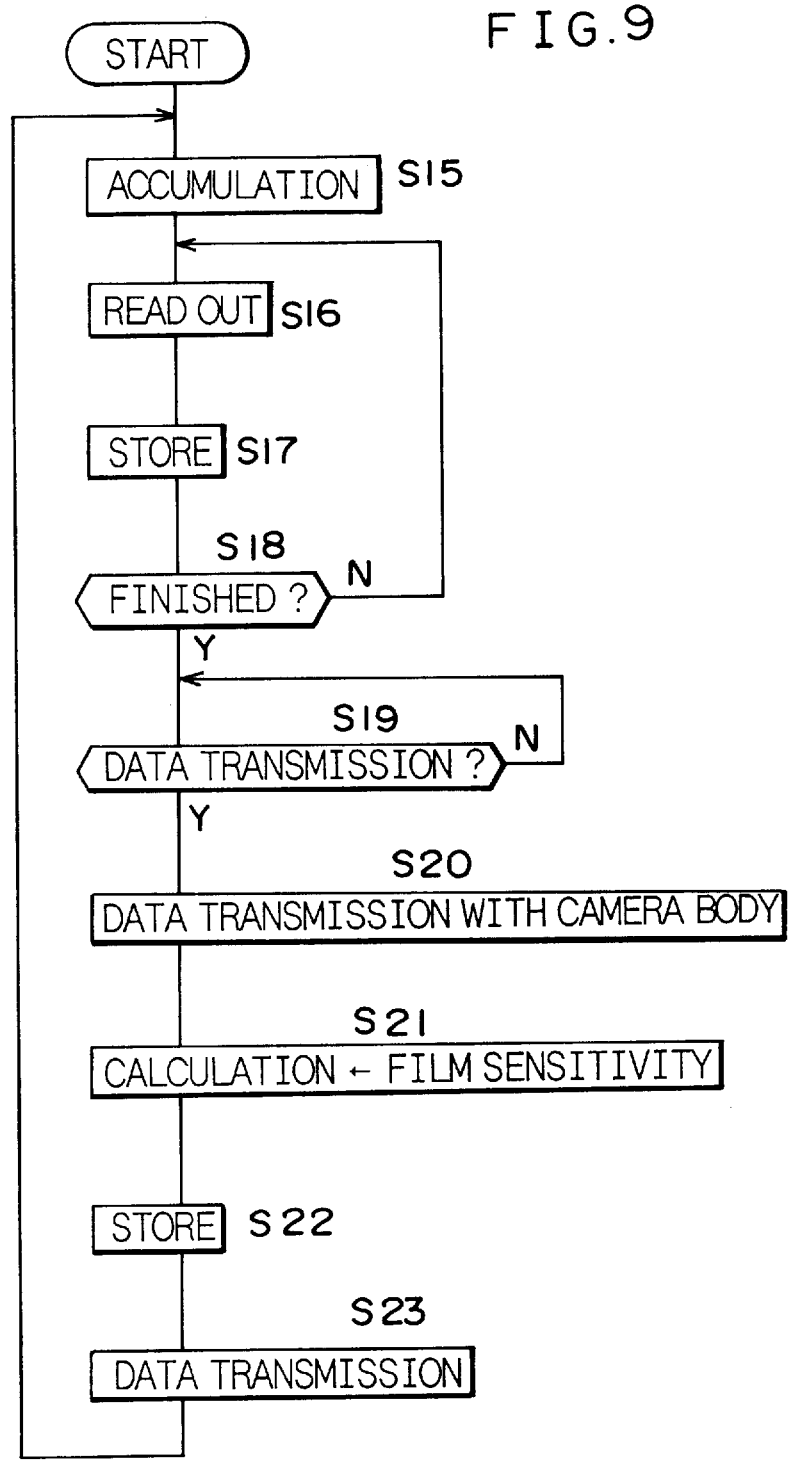
FIG. 9 is a flow chart showing procedures of a control program in the viewfinder.
Figure 11:
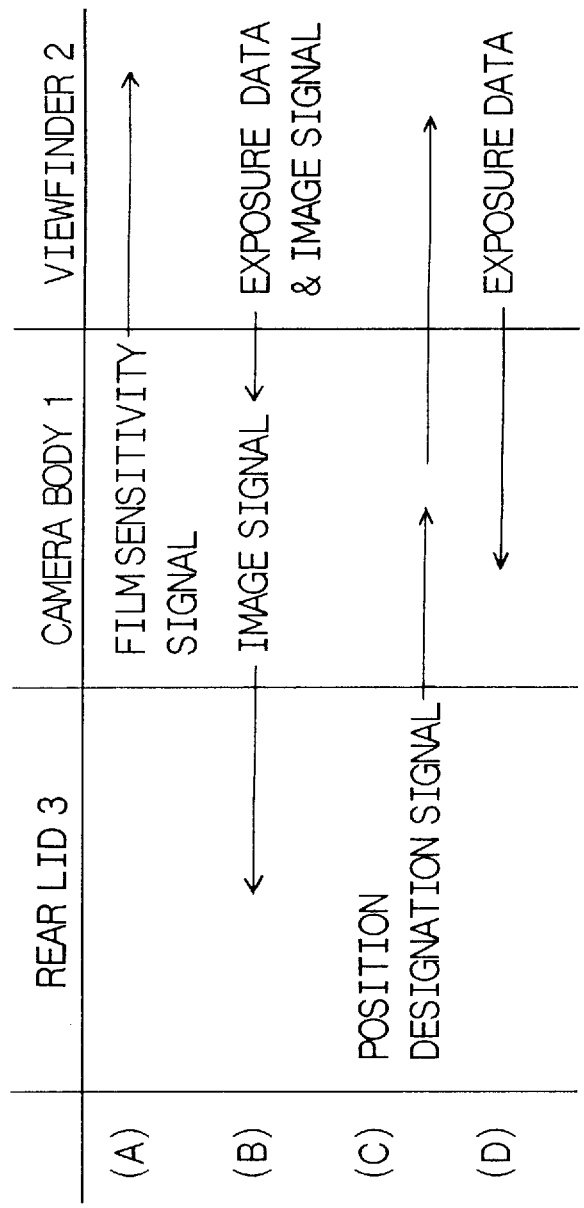
FIG. 11 is a figure showing the pattern of signal transfer between the viewfinder, the camera body, and the rear lid.

FIG. 9 is a flow chart showing the operation of the control program for the CPU 101 incorporated in the viewfinder 2. This program is always continually executed in an endless loop as long as power continues to be supplied to the viewfinder 2.

In the step S15, the photometric sensor 25 is actuated. Then, each of the various sub-elements (in FIG. 3 constituting the photometry sensor 25 receives the light from the object to be photographed and converts it into electric charge, and the electric charge accumulation section accumulates this electric charge which is produced. In the step S16, a read out process is performed in which photometric output is read out. Namely, the above described accumulated electric charges are read out one by one by the transmission section in time series according to the receipt of a predetermined clock signal. The voltage conversion section converts the read out electric charges into voltages and these voltage signals are input to an A/D converter included in the CPU 101. The A/D converter successively converts the voltage signals into digital signals. In the step S17, the A/D converted signals (photometric signals) are stored in the storage circuit 104.

In the step S18, a decision is made as to whether or not the above processing in the steps S16 and S17 has been performed for all of the M×N sub-elements. If the result of this decision is NO, the flow of control returns to the step S16, while if the result of this decision is YES, the flow of control passes to the step S19. In the step S19, the flow of control waits until the ISO sensitivity value and possibly the position designation signal are received from the camera body 1. In the step S20, the above described transmitted signal(s) is (are) input and in the step S21, based upon the above described M×N photometric output signals which were stored in the step S17, the above described film ISO sensitivity value which was input and the position designation signal, the iris opening value and shutter speed are calculated so that an appropriate exposure is made for the object to be photographed for which the position has been thus designated. Moreover, if no such position designation signal for the object to be photographed has been input, the exposure data are calculated based only upon the photometric output signals and the film sensitivity value.

In the step S22, these calculated exposure data are stored in the storage circuit 104. In the step S23, these stored exposure data are transferred to the side of the camera body via the contact 95, and also the M×N photometric output signals which were stored in the step S17 are transferred to the camera body as object image signals. After this the flow of control returns to the step S15, and the above described process is repeated.

FIG. 10 is a flow chart showing the operation of the control program for the CPU 110 shown in FIG. 7 and incorporated in the rear lid 3. This program is always continually executed in an endless loop as long as power continues to be supplied from the DC/DC converter 71 in the camera body 1 to the rear lid 3 via the contact 87.

Figure 12:
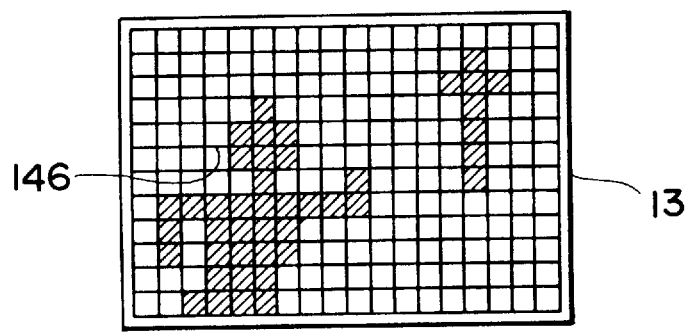
FIGS. 12 and 13 are figures for explanation of an object to be photographed designated by flashing.
Figure 13:
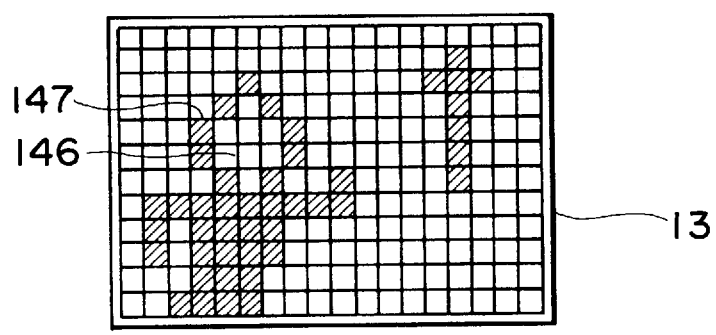

First, in the step S25, the program waits until communication with the camera body 1 is performed. When communication is performed, then the flow of control passes to the step S26. In the step S26, a decision is made as to whether or not the signal obtained from the camera body 1 includes the above-mentioned object image signal. If the answer is NO, the flow of control returns to the step S15, while if the object image signal is included, then the flow of control continues to the step S27. In this step S27, the intensity levels of the K×L display elements which make up the display device 13 are controlled according to the values of the corresponding ones of the M×N object image signals which has been input, so as to display an object image corresponding to the distribution of brightness on the display device 13. Next, in the step S28, a decision is made as to whether or not the position of the principal object to be photographed is being designated by operating the touch panel 14. If no position is being designated, the flow of control returns to the step S25 to repeat the above described process. While if a position is being designated, the flow of control passes to the step S29 in which for example the location whose position has been designated is displayed by flashing as shown in FIGS. 12 and 13. In the step S30, communication with the camera body 1 is performed, so that a position designation signal which bears information about the designated position is transmitted to the side of the camera body 1. The above described flashing display provided in the step S29 will be described in detail hereinafter.

The foregoing is the detailed description of the control processes executed by the CPUs in the camera body 1, the viewfinder 2 and the rear lid 3. The following is the summary of these control processes.

First, as shown in FIG. 11(A), the film sensitivity signal is transmitted from the camera body 1 to the viewfinder 2. Then the exposure data are calculated in the viewfinder 2, based upon the output photometric signals from the photometric sensor 25 as well as upon the film sensitivity signal which has been transmitted from the camera body 1. Moreover, since at the beginning designation of the position of the object to be photographed is not being performed, the above exposure calculation does not consider any position designation signal. When the exposure data have been calculated, the viewfinder 2, as shown in FIG. 11(B), transmits these exposure data and also the photometric output signals (the object image signals) to the camera body 1. The camera body 1 then transmits to the rear lid 3 these object image signals thus received. In the rear lid 3, the distribution of brightness over the subject, i.e. an image of the object to be photographed corresponding to the brightness, is displayed on the display device 13, based upon these received object image signals. If designation of the position of the principal object to be photographed is being performed, the designated position is displayed by flashing, and further as shown in FIG. 11(C), a position designation signal is transmitted to the camera body 1.

The camera body 1, when the position designation signal has been received from the rear lid 3, enters into communication for a second time with the viewfinder 2, and transmits the position designation signal to the viewfinder 2. The viewfinder 2, based upon the position designation signal thus receives, upon the above described photometric output signals, and upon the film sensitivity signal, calculates exposure data which attain an appropriate exposure for the designated object to be photographed, and as shown in FIG. 11(D), again transmits the exposure data to the camera body 1. The camera body 1 performs photography according to the transmitted exposure data in response to the ON operation of the release switch.

FIGS. 12 and 13 show an example of how the object to be photographed whose position has been designated as described above is shown by flashing. Under the assumption that the object image of the subject shown in FIG. 12 is being displayed on the display device 13. When in this condition the photographer presses upon a portion of the previously described touch panel 14 which corresponds to a head portion 146 of the object image for which an appropriate exposure is required, then as shown in FIG. 13, the head portion 146 of the object image is immediately inverted into white, and further the portion 147 surrounding it is displayed as black so as to constitute a border. Further, repeatedly every 0.5 seconds (for example) the FIG. 12 display and the FIG. 13 display are alternated, so that it becomes easy to differentiate at a glance this position at which the object to be photographed has been designated from other portions of the display.

With the preferred embodiment of the present invention as described above, since the construction is such that an object image is displayed on the display device 13 in various intensity levels in correspondence with the distribution of brightness on the subject, thereby the photographer is enabled to determine the distribution of brightness on the subject, i.e. the results of the photometric operation performed by the photometric sensor 25. Further, after confirmation of the displayed object image, if a portion for which an appropriate exposure is expected is designated by using the touch panel 14, since the exposure data are calculated so that an appropriate exposure is attained for this designated portion, at whatever position over the subject the designated principal object may exist, it is possible to photograph the principal object to be photographed employing an appropriate exposure. In particular, in this preferred embodiment, since the display device 13 is provided on the rear surface of the rear lid 3, it is possible for this display device 13 to be relatively large, so that the viewability thereof is enhanced.

The position designation means for the principal object to be photographed is not limited to the above described type of touch panel switch 14. For example, as shown in FIGS. 14 and 15, it is also possible to use a so called cross key switch 145 provided near the display device 13. By pressing any one of four keys of the cross key switch 145, the flashing position on the display device 13 designating the principal object to be photographed, as shown in FIGS. 14 and 15, can be moved. In concrete terms, press of a start and setting switch 160 causes a set of the elements of the display at the upper leftmost position thereof to start flashing. From this state, the photographer moves this set of flashing display elements upwards, downwards, leftwards, or rightwards by pressing the appropriate one of the keys of the cross key switch 145 in the direction of the image of the principal object which he desires to photograph. When the flashing portion has arrived over the desired position, he again presses the switch 160, so as to determine the designated position. Moreover, with this type of device, it would be acceptable as an alternative to provide the start and setting switch 160 as two separate devices. Further, as an alternative, instead of the cross key switch 145, it would also be acceptable to provide a single elongated horizontal movement key switch and a single elongated vertical movement key switch, with the flashing portion on the display being moved leftwards or rightwards by the left end or the right end respectively of the horizontal movement key switch being pressed, and with the flashing portion being moved upwards or downwards on the display by the upper end or the lower end respectively of the vertical movement key switch being pressed.

FIG. 16 shows another variant embodiment for the method of designating the position of the principal object to be photographed. The display device 149 of FIG. 16 displays an object image according to the distribution of brightness in the same manner as described above, but no portion on this image is shown as flashing for indicating the position of the principal object to be photographed. Instead of a flashing portion, cursor display portions 150 and 151 which may be constituted by LCDs are provided, for example, along the upper edge and along the left edge of the display device 149. In use, arrow shaped indicator segments 152 and 153 respectively are displayed within these cursor display portions 150 and 151. The position of the head portion 146 of the principal object is considered as lying at the intersection of the vertical and horizontal lines respectively extending from these indicator segments 152 and 153. Accordingly, both of the indicator segments 152 and 153 can be moved in response to movement of the object.

It would be possible to move these indicator segments 152 and 153 by using the cross key switch 145 shown in FIGS. 14 and 15. However, in the FIG. 16, instead of the cross key switch, a so called trackball 148 is provided. I.e., by rotating the trackball 148, a plurality of switches provided behind it are actuated, and these can provide the same direction setting function as did the cross key switch 145. In this case, although for implementing the functions of the start and setting switch the solution used in the previous embodiment shown in FIGS. 14 and 15 would be acceptable, a corresponding switch can be provided in the central portion of the cavity behind the trackball 148 so that by simply pressing the body of the trackball 148 inward, the functions of a start and setting switch may be implemented. When the space on the rear lid 3 is relatively limited, the type of construction shown in FIG. 16 is effective.

Although in the above embodiments the display device 13 was shown as being disposed on the rear lid 3, the display device is not limited to being positioned on the camera rear lid, but may for example be disposed on the upper surface of the camera body 1.

The object image may be displayed on a display device capable of displaying photographic information other than the object image. The display device 13 may be provided in the viewfinder 2 as a type of an electronic viewfinder. In addition, the object image may be seen on a monitor outside the camera body to which the object image signals are transferred.

The display device may be of a type other than a liquid crystal display device, and, for example, instead of an intensity code device a color code device may be used. Yet further, the photometric sensor is not limited to being a CCD type sensor, but could acceptably be a sensor which was not of a charge accumulation type. Still yet further, although the above explanation has been made in terms of a single lens reflex camera employing the so called TTL photometric method, as an alternative the present invention could also be applied to a lens shutter type camera employing an external type of photometry, in which photometry is performed upon light from an object to be photographed which has passed through an optical system which does not include the photographic lens. Accordingly, in this case, the photometer sensor may be arranged outside the viewfinder.

The above explanation was made in which appropriate exposure data were calculated so that the principal object designated by the touch panel switch on the display device 13 is subjected to be exposed appropriately. However, the present invention may be applicable to the camera with a focus adjustment device which can focus on the above designated principal object. In this case, it is necessary to provide a plurality of focus detecting regions in accordance with a number of or position of divided elements of the displaying device 13.

We claim:

1. A camera capable of displaying brightness distribution comprising:

a photometric sensor which comprises a plurality of photoelectric conversion sub-elements which perform photometry on a plurality of regions into which the subject is divided;

an image processing circuit which processes an output from said photometric sensor to output an image signal regarding the brightness distribution over the subject;

a display device connected to said image processing circuit, said display device displaying the brightness distribution over the subject based upon said image signal output by said image processing circuit, said display device displaying said brightness distribution as an exemplary pattern of the subject;

a designating device which designates any one of a plurality of positions within display regions of said display device; and:

a flashing device which flashes the designated portion on said display device.

2. A camera capable of displaying brightness distribution according to claim 1, wherein said display device comprises K×L display elements arranged in the form of a matrix which measures K elements in the vertical direction by L elements in the horizontal direction.

3. A camera capable of displaying brightness distribution according to claim 1, wherein said display device is provided on the rear surface of a rear lid of said camera.

4. A camera capable of displaying brightness distribution according to claim 1, further comprising a calculation device that calculates exposure data that achieves an appropriate exposure for the designated region based upon the output of the photometric sensor and upon the position designated by said designating device.

5. A camera capable of displaying brightness distribution according to claim 1, wherein said display device comprises liquid crystal display elements which are capable of being set to any one of a plurality of intensity levels.

6. A camera capable of displaying brightness distribution according to claim 1, wherein said photometric sensor comprises M×N of said photometric conversion sub-elements arranged in the form of a matrix which measures M elements in the vertical direction by N elements in the horizontal direction.

7. A camera capable of displaying brightness distribution according to claim 6, wherein said display device comprises K×L display elements arranged in the form of a matrix which measures K elements in the vertical direction by L elements in the horizontal direction.

8. A camera capable of displaying brightness distribution according to claim 7, wherein K is approximately equal to M and L is approximately equal to N.

9. A camera capable of designating a principal object to be photographed comprising:

a photometric sensor which comprises a plurality of photoelectric conversion sub-elements which perform photometry on a plurality of regions into which the subject is divided;

a display device which displays the brightness distribution over the subject as detected by said photometric sensor, said display device displaying said brightness distribution as an exemplary pattern of the subject;

a designating device which designates any one of a plurality of positions within display regions of said display device; and:

a flashing device which flashes the designated portion on said display device.

10. A camera capable of designating a principal object to be photographed according to claim 9, further comprising a calculation device which calculates exposure data which attains an appropriate exposure for said designated region, based upon the output from said photometric sensor and upon the position designated by said designating device.

11. A camera capable of designating a principal object to be photographed according to claim 9, further comprising a focus detecting device which performs a focus detecting operation on the object designated by said designating device.

12. A camera capable of designating a principal object to be photographed according to claim 9, wherein said designating device comprises a touch panel switch provided on the surface of said display device.

13. A camera capable of designating a principal object to be photographed according to claim 9, wherein said designating device comprises a horizontal direction key for moving the position which is desired to be designated in the horizontal direction, a vertical direction key for moving the position which is desired to be designated in the vertical direction, and a setting switch which determines the position designated by the use of said horizontal and vertical direction keys as a final designated position.

14. A camera capable of designating a principal object to be photographed according to claim 13, wherein said horizontal designation key comprises a leftward key for moving the position which is desired to be designated in the leftward direction and a rightward key for moving the position which is desired to be designated in the rightward direction, and said vertical designation key comprises an upward key for moving the position which is desired to be designated in the upward direction and a downward key for moving the position which is desired to be designated in the downward direction.

15. A camera capable of designating a principal object to be photographed according to claim 9, wherein said designating device comprises a trackball by the rotation of which the position which is desired to be designated can be moved in the horizontal direction and in the vertical direction.

16. A camera capable of designating a principal object to be photographed according to claim 9, wherein said display device comprises designation sections which designate the position corresponding to the horizontal and vertical directions of said designated portion on said display device and arranged along a vertical side and a horizontal side of said display device.

17. A camera capable of displaying brightness distribution comprising:
 a photometric sensor comprising M×N photometric conversion sub-elements arranged in the form of a matrix which measures M elements in the vertical direction by N elements in the horizontal direction, and which performs photometry on M×N regions into which the subject is divided;
 a display device which comprises K×L liquid crystal display elements arranged in the form of a matrix which measures K elements in the vertical direction by L elements in the horizontal direction and each of which is capable of being set to any one of a plurality of intensity levels, and which displays the brightness distribution over the subject as detected by said photometric sensor, said display device displaying said brightness distribution as an exemplary pattern of the subject;
 a designating device which designates at least any one of a plurality of positions within the K×L regions of said display device; and
 a flashing device which flashes the designated portion on said display device.

18. A camera capable of displaying brightness distribution according to claim 17, further comprising a designating device which designates any one of a plurality of positions within the display regions of said display device.

19. A camera capable of displaying brightness distribution according to claim 17, wherein K is approximately equal to M and L is approximately equal to N.

20. A camera capable of displaying brightness distribution according to claim 17, further comprising a calculation device that calculates exposure data that achieves an appropriate exposure for the designated region based upon the output of the photometric sensor and upon the position designated by said designating device.

21. A camera capable of displaying brightness distribution comprising:
 a photometric sensor which comprises a plurality of photoelectric conversion sub-elements which perform photometry on a plurality of regions into which the subject is divided;
 an image processing circuit which processes an output from said photometric sensor to output an image signal regarding the brightness distribution over the subject;
 a display device connected to said image processing circuit, said display device displaying the brightness distribution over the subject based upon said image signal output by said image processing circuit, said display device displaying said brightness distribution as an exemplary pattern of the subject;
 a designating device which designates any one of a plurality of positions within display regions of said display device; and:
  wherein said display device comprises designation sections which designate the position corresponding to the horizontal and vertical positions of the designated portion on said display device, said designation sections being arranged along a vertical side and a horizontal side of said display device.

22. A camera capable of displaying brightness distribution according to claim 21, further comprising a calculation device that calculates exposure data that achieves an appropriate exposure for the designated region based upon the output of the photometric sensor and upon the position designated by said designating device.

23. A camera capable of displaying brightness distribution comprising:
 a photometric sensor comprising M×N photometric conversion sub-elements arranged in the form of a matrix which measures M elements in the vertical direction by N elements in the horizontal direction, and which performs photometry on M×N regions into which the subject is divided;
 a display device which comprises K×L liquid crystal display elements arranged in the form of a matrix which measures K elements in the vertical direction by L elements in the horizontal direction and each of which is capable of being set to any one of a plurality of intensity levels, and which displays the brightness distribution over the subject as detected by said photometric sensor, said display device displaying said brightness distribution as an exemplary pattern of the subject;
 a designating device which designates any one of a plurality of positions within the K×L regions of said display device; and
 wherein said display device comprises designation sections which designate the position corresponding to the horizontal and vertical positions of said designated portion on said display device, said designation sections being arranged along a vertical side and a horizontal side of said display device.

24. A camera capable of displaying brightness distribution according to claim 23, further comprising a calculation device that calculates exposure data that achieves an appropriate exposure for the designated region based upon the output of the photometric sensor and upon the position designated by said designating device.

25. A camera comprising:

a image taking-up device that takes up an image on a subject field;

a display device that is located on a rear surface of said camera and displays information in the form of a matrix, said information being output from said image taking-up device; and:

a data input device arranged onto said display device so as to be overlapped with said display device, said data input device inputting data.

26. A camera according to claim 25, wherein said data input device comprises an information obtaining device which designates any position of said image displayed on said display device so as to read in information regarding the designated position.

27. A camera according to claim 25, wherein said data input device includes a touch panel type data input device having a touch panel switch on the surface of the data input device.

28. A camera comprising:

an image taking-up device that takes up an image on a subject field;

a display device that displays the image on the subject field;

a touch panel that is arranged onto said display device so as to be overlapped with said display device and designates any one of a plurality of positions within a display area of said display device by being touched; and a controller that controls image acquisition based upon brightness of an image corresponding to a position that is designated by said touch panel.

29. A camera according to claim 28, wherein said controller controls image acquisition so that the image corresponding to the position that is designated by said touch panel is recorded with an appropriate exposure.

30. A camera comprising:

a lens that collects an image on a subject field;

an image taking-up device that takes up the image on the subject field;

a display device that is located on a plane perpendicular to an optical axis of said lens and displays the image on the subject field; and a data input device arranged onto said display device so as to be overlapped with said display device, said data input device inputting data.

* * * * *